(12) United States Patent
Skudder

(10) Patent No.: US 9,995,946 B2
(45) Date of Patent: Jun. 12, 2018

(54) TORIC LENS

(71) Applicant: PEGAVISION CORPORATION, Taoyuan (TW)

(72) Inventor: Colin Skudder, Guishan Township, Taoyuan County (TW)

(73) Assignee: PEGAVISION CORPORATION, Taoyuan (TW)

( * ) Notice: Subject to any disclaimer, the term of this patent is extended or adjusted under 35 U.S.C. 154(b) by 0 days. days.

(21) Appl. No.: 14/303,782

(22) Filed: Jun. 13, 2014

(65) Prior Publication Data

US 2015/0362746 A1   Dec. 17, 2015

(51) Int. Cl.
*G02C 7/00* (2006.01)
*G02C 7/02* (2006.01)
*G02C 7/04* (2006.01)

(52) U.S. Cl.
CPC ............. *G02C 7/022* (2013.01); *G02C 7/02* (2013.01); *G02C 7/04* (2013.01); *G02C 7/045* (2013.01); *G02C 7/047* (2013.01); *G02C 7/048* (2013.01); *G02C 2202/02* (2013.01); *G02C 2202/06* (2013.01)

(58) Field of Classification Search
CPC .... G02C 7/022; G02C 7/047; G02C 2202/06; G02C 7/04; G02C 7/028; G02C 7/049; G02C 7/048; G02C 7/041; G02C 7/02; G02C 7/024; G02C 7/044; G02C 7/042; A61F 2/145; A61F 2/16; A61F 2/1602; A61F 2/1613; A61F 2/1618; A61F 2/1645; B29L 2011/0025; A61L 2430/16; A61L 27/50; G02B 1/043; G01M 11/0257

USPC ........... 351/159.02–159.05, 159.21, 159.22, 351/159.36, 159.38, 159.54, 351/159.72–159.78; 359/207.6, 711, 721
See application file for complete search history.

(56) References Cited

U.S. PATENT DOCUMENTS

| 4,923,296 A | 5/1990 | Erickson |
| 5,096,285 A | 3/1992 | Silberman |
| 5,173,723 A | 12/1992 | Volk |

(Continued)

FOREIGN PATENT DOCUMENTS

| GB | 2503910 A | 1/2014 |
| JP | 2004-536343 A | 12/2004 |

(Continued)

OTHER PUBLICATIONS

Office Action issued in corresponding Japanese Patent Application No. 2014-181252, dated Oct. 2, 2015.

(Continued)

*Primary Examiner* — Mustak Choudhury
(74) *Attorney, Agent, or Firm* — Merchant & Gould P.C.

(57) ABSTRACT

A toric lens includes a first surface, a second surface, two first sector zones, and two second sector zones. The first surface and the second surface are opposite to each other. Each of the first sector zones has a first curvature on the first surface along a radial direction of the toric lens, and the first curvature is constant along an arc direction of the toric lens. The two second sector zones are alternately arranged with the two first sector zones. Each of the second sector zones has a second curvature on the first surface along the radial direction, and the second curvature is constant along the arc direction. The first curvature is steeper than the second curvature.

19 Claims, 7 Drawing Sheets

(56) References Cited

U.S. PATENT DOCUMENTS

| | | | |
|---|---|---|---|
| 5,198,844 A | | 3/1993 | Roffman et al. |
| 5,953,098 A | * | 9/1999 | Lieberman ............. G02C 7/041 351/159.2 |
| 6,533,416 B1 | * | 3/2003 | Fermigier ................ A61F 2/16 351/159.22 |
| 7,296,890 B2 | * | 11/2007 | Svochak ................ G02C 7/028 351/159.02 |
| 2007/0091259 A1 | | 4/2007 | Svochak |
| 2011/0279912 A1 | | 11/2011 | Fiala |
| 2012/0029631 A1 | * | 2/2012 | Wanders ............... A61F 2/1602 623/6.27 |
| 2012/0062835 A1 | | 3/2012 | Clamp et al. |
| 2012/0147321 A1 | * | 6/2012 | Portney ................ A61F 2/1613 351/159.15 |

FOREIGN PATENT DOCUMENTS

| | | |
|---|---|---|
| JP | 2008-543465 A | 12/2008 |
| JP | 2013-218355 A | 10/2013 |
| TW | I341404 | 2/2008 |
| TW | 200951533 A1 | 12/2009 |
| WO | 92/06400 A1 | 4/1992 |
| WO | WO 92/06400 | 4/1992 |
| WO | 03/107076 A1 | 12/2003 |
| WO | 2014/013523 A1 | 1/2014 |

OTHER PUBLICATIONS

Office Action issued in corresponding Russian Patent Application No. 2014136764, dated Oct. 23, 2015.
Extended European Search Report issued in corresponding European Patent Application No. 14179695.3, dated Oct. 14, 2015.

* cited by examiner

TORIC LENS

BACKGROUND

Field of Invention

The present invention relates to a toric lens for visual correction.

Description of Related Art

A lens is an optical device for visual correction. Toric lenses are used for the correction of astigmatism. A stigmatism is an eye condition with blurred vision as its main symptom. The front surface of the eye (cornea) of a person with astigmatism is not curved properly. The curve is irregular, typically involving one half being steeper than the other. Sometimes one area is steeper than it should be. When light rays enter the eye, they do not focus correctly on the retina, resulting in a blurred image. Astigmatism may also be caused by an irregularly shaped lens, which is located behind the cornea.

Contact lenses for correcting astigmatism have been known in the market for at least since the 1980's. While there are toric lenses which serve their purpose well, the lens design are considered complicated. Worse yet, to fulfill patient's need for visual acuity, over 3000 stock keeping unit (sku) is required. This not only add burden to lens manufacturers for manufacturing and warehousing, but also a burden for whole sellers as well as eye care professional in keep big and complicated inventory. In addition, to cover visual correction needs, higher lens thickness is required. And this brings not only more difficulty in manufacturing, but also make lenses less comfortable and clinically less healthy for eye due to decrease of oxygen transmissibility.

Because of the above, there is a great need for smarter and novel lens design for correcting astigmatism which not only make lens manufacturer becomes able to simplify their manufacturing process, reduce the cost of inventory, but also make lenses more comfortable to wear and improve eye health.

SUMMARY

An aspect of the present invention is to provide a toric lens including a first surface, a second surface, two first sector zones, and two second sector zones. The first surface and the second surface are opposite to each other. Each of the first sector zones has a first curvature on the first surface along a radial direction of the toric lens, and the first curvature is constant along an arc direction of the toric lens. The two second sector zones are alternately arranged with the two first sector zones. Each of the second sector zones has a second curvature on the first surface along the radial direction, and the second curvature is constant along the arc direction. The first curvature is steeper than the second curvature.

In one or more embodiments, the toric lens further includes a horizontal meridian and a vertical meridian perpendicular to each other. A maximum thickness of the toric lens along the horizontal meridian is greater than a maximum thickness of the toric lens along the vertical meridian.

In one or more embodiments, a central angle of each of the first sector zones and a central angle of each of the second sector zones are both about 90 degrees.

In one or more embodiments, a boundary, each between adjacent sides of one of the first sector zones and one of the two second sector zones adjacent to said one of the first sector zones, is at about 45 degrees from the horizontal meridian.

In one or more embodiments, the horizontal meridian passes through the two first sector zones.

In one or more embodiments, the horizontal meridian passes through the two second sector zones.

In one or more embodiments, a boundary, each between adjacent sides of one of the first sector zones and one of the two second sector zones adjacent to said one of the first sector zones, is at the horizontal meridian or at the vertical meridian.

In one or more embodiments, the first sector zones are disposed between about 0 degrees to about 90 degrees from the horizontal meridian, and the second sector zones are disposed between about 90 degrees to about 180 degrees from the horizontal meridian.

In one or more embodiments, the second sector zones are disposed between about 0 degrees to about 90 degrees from the horizontal meridian, and the first sector zones are disposed between about 90 degrees to about 180 degrees from the horizontal meridian.

In one or more embodiments, the toric lens further includes four third sector zones for bridging the first sector zones and the second sector zones.

In one or more embodiments, each of the third sector zones has a third curvature on the first surface along the radial direction, and the third curvature is gradually decreased from the first curvature to the second curvature along the arc direction.

In one or more embodiments, a central angle of each of the third sector zones is smaller than about 10 degrees.

In one or more embodiments, a central angle of each of the first sector zones and a central angle of each of the second sector zones are the same.

In one or more embodiments, the horizontal meridian passes through the first sector zones.

In one or more embodiments, the horizontal meridian passes through the second sector zones.

In one or more embodiments, the horizontal meridian passes through the third sector zones.

In one or more embodiments, the first surface is a front surface of a contact lens, and the second surface is a back surface of the contact lens.

In one or more embodiments, the first surface is a back surface of a contact lens, and the second surface is a front surface of the contact lens.

In one or more embodiments, the first surface is convex or concave.

In one or more embodiments, the second surface is convex or concave.

DETAILED DESCRIPTION

Figure 1:
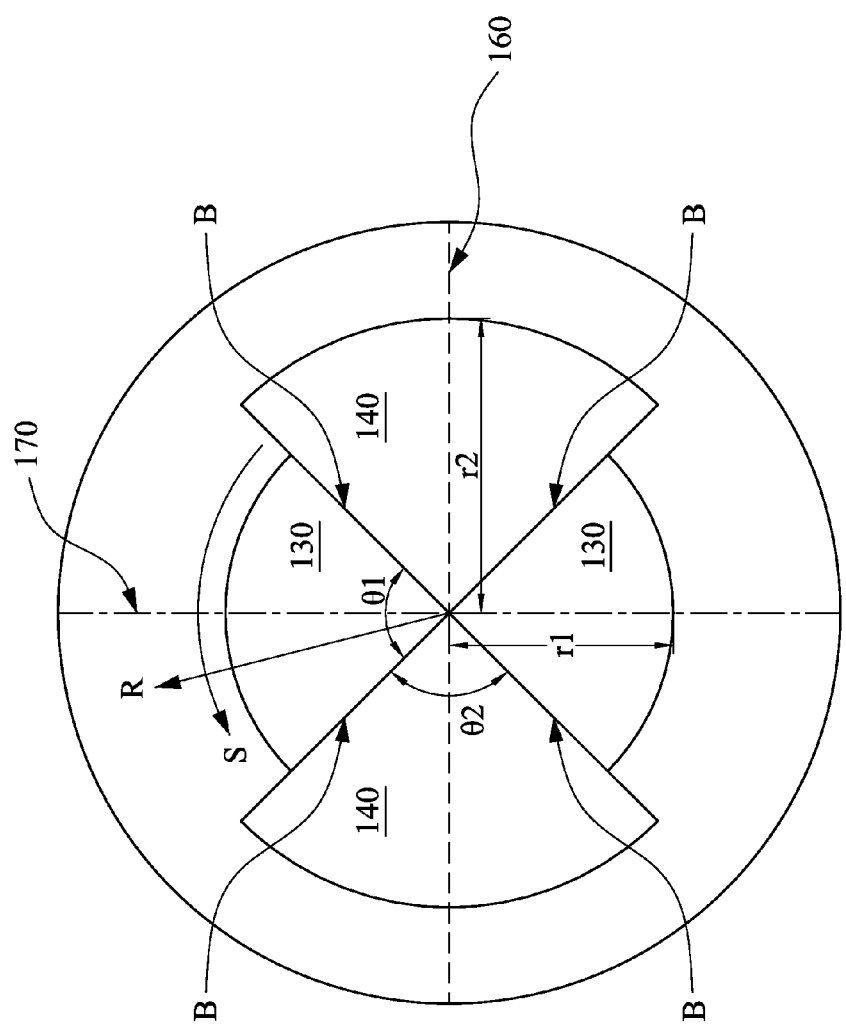
FIG. 1 is a front view of a toric lens according to a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2B:
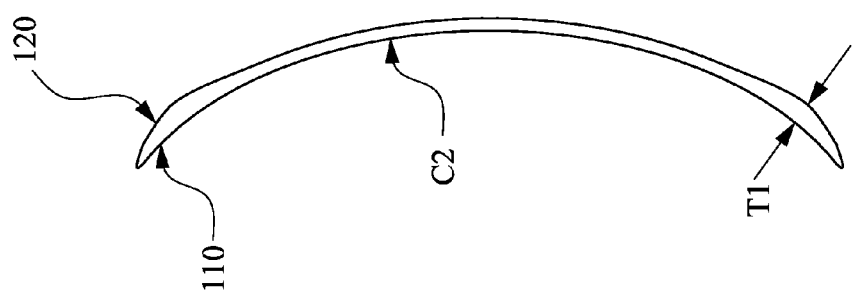
FIG. 2B is a cross-sectional view taken along a horizontal meridian of FIG. 1.
Figure 2A:
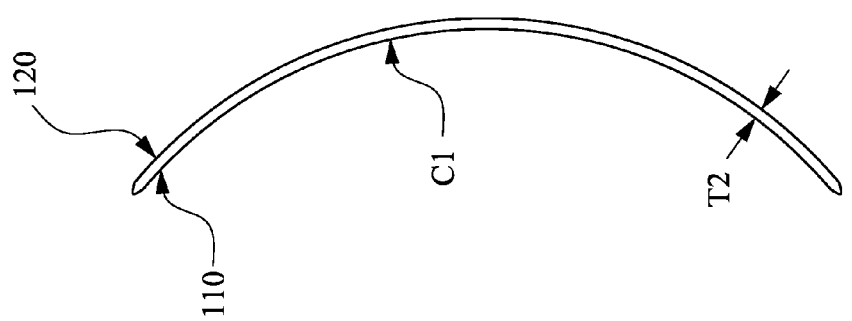
FIG. 2A is a cross-sectional view taken along a vertical meridian of FIG. 1 according to one embodiment.

FIG. 1 is a front view of a toric lens according to a first embodiment of the present invention, FIG. 2A is a cross-sectional view taken along a vertical meridian 170 of FIG. 1 according to one embodiment, and FIG. 2B is a cross-sectional view taken along a horizontal meridian 160 of FIG. 1. The toric lens includes a first surface 110, a second surface 120, two first sector zones 130, and two second sector zones 140. The first surface 110 and the second surface 120 are opposite to each other. Each of the first sector zones 130 has a first curvature C1 on the first surface 110 along a radial direction R of the toric lens, and the first curvature C1 is constant along an arc direction S of the toric lens. The two second sector zones 140 are alternately arranged with the two first sector zones 130. Each of the second sector zones 140 has a second curvature C2 on the first surface 110 along the radial direction R, and the second curvature C2 is constant along the arc direction S. The first curvature C1 is steeper than the second curvature C2. As shown in the front view of FIG. 1, each of the first sector zones 130 has a radius r1, and each of the second sector zones 140 has a radius r2. Since the first curvature C1 is steeper than the second curvature C2, the radius r1 has a smaller length than the radius r2.

In this embodiment, the first sector zones 130 can be utilized to correct astigmatism of a patient. Typically, the front surface of the eyes of a patient with astigmatism does not have an ideal curvature. The curve is irregular and usually one half is steeper than the other, thereby requiring an optical system (such as a contact lens) for correcting the astigmatism. The vision may be blurred if the optical system is worn improperly. For example, with conventional configurations, the vision becomes blurred if the optical system rotates merely 5 degrees. In contrast, in this embodiment, the first curvature C1 is constant along the arc direction S. That is, even if the toric lens is rotated, the patient can still experience clear vision over a specific angle range. Moreover, a single toric lens in this embodiment can be suitable for different patients as long as they have astigmatism axes within the first sector zones 130. Therefore, stores, clinics, etc. that sell toric lenses can have on stock only a few different types of toric lenses and can still service most patients with astigmatism.

In this embodiment, the first curvature C1 can be a cylinder power curve, and the second curvature C2 can be a sphere power curve. However, the claimed scope is not limited in this respect.

In this embodiment, the toric lens further includes the horizontal meridian 160 and the vertical meridian 170 perpendicular to each other, where the horizontal meridian 160 is substantially parallel to an imaginary line that inter- connects the two eyes of a patient (hereinafter "connection line"), while the vertical meridian 170 is substantially perpendicular to the connection line. A maximum thickness T1 of the toric lens along the horizontal meridian 160 is greater than a maximum thickness T2 of the toric lens along the vertical meridian 170. This configuration provides for more stability of the toric lens and prevents the toric lens from over rotating when the patient wears the toric lens. It is to be noted that since the toric lens in this embodiment is allowed to rotate within a specific angle range, the maximum thickness T1 can be smaller than a maximum thickness of a conventional toric lens with configurations for optimizing stabilization. That is, compared with the conventional toric lens, the thickness and weight of the toric lens in this embodiment are both reduced, resulting in enhanced comfort for the patient.

In this embodiment, a central angle θ1 of each of the first sector zones 130 and a central angle θ2 of each of the second sector zones 140 are both about 90 degrees. Therefore, the patient can experience clear vision over a 90-degree angle, and thus, the rotation tolerance of the toric lens in this embodiment is increased compared to the conventional toric lens.

In this embodiment, boundaries B, each between adjacent sides of one of the first sector zones 130 and one of the two second sector zones 140 adjacent thereto, is at about 45 degrees from the horizontal meridian 160, and the horizontal meridian 160 passes through the two second sector zones 140. That is, the areas of the first sector zones 130 are respectively between about 45 degrees and about 135 degrees and between about 225 degrees and about 315 degrees from the horizontal meridian 160, and the areas of the second sector zones 140 are respectively between about 135 degrees and about 225 degrees and between about 315 degrees and about 45 degrees from the horizontal meridian 160. This configuration can be utilized with a patient suffering from with-the-rule astigmatism, involving an astigmatism axis between about 45 degrees and about 135 degrees from the horizontal meridian 160.

Figure 3:
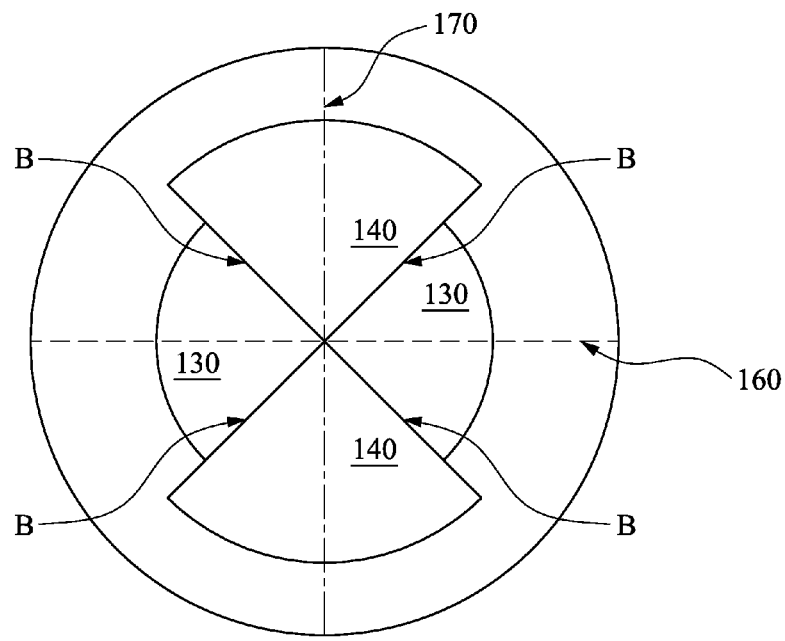
FIG. 3 is front view of a toric lens according to a second embodiment of the present invention.

FIG. 3 is a front view of a toric lens according to a second embodiment of the present invention. The difference between the second embodiment and the first embodiment pertains to the positions of the first sector zones 130 and the second sector zones 140. In this embodiment, the horizontal meridian 160 passes through the two first sector zones 130. That is, the areas of the first sector zones 130 are respectively between about 135 degrees and about 225 degrees and between about 315 degrees and about 45 degrees from the horizontal meridian 160, and the areas of the second sector zones 140 are respectively between about 45 degrees and about 135 degrees and between about 225 degrees and about 315 degrees from the horizontal meridian 160. This configuration can be utilized with a patient suffering from against-the-rule astigmatism, which involves an astigmatism axis between 0 degrees and about 45 degrees and between about 135 degrees to about 180 degrees from the horizontal meridian 160.

Figure 4:
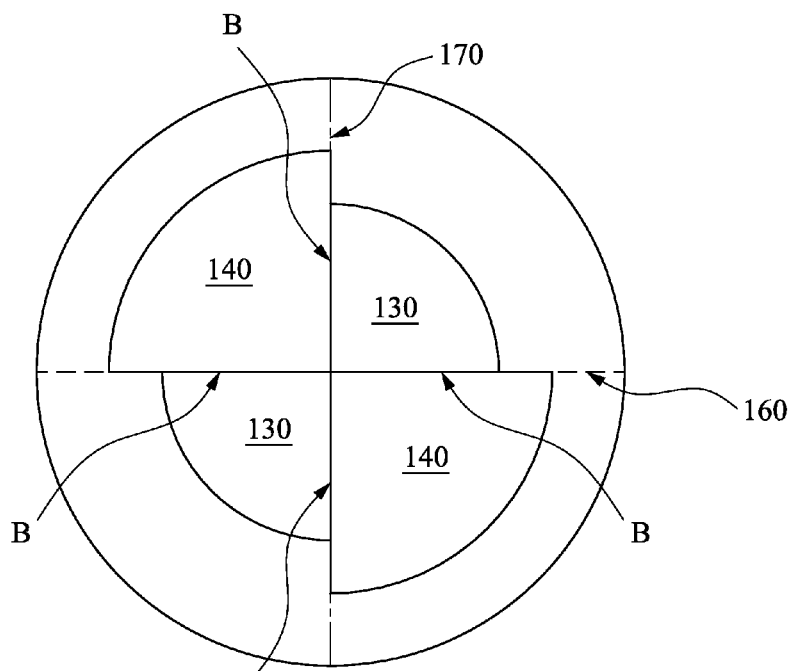
FIG. 4 is front view of a toric lens according to a third embodiment of the present invention.

FIG. 4 is a front view of a toric lens according to a third embodiment of the present invention. The difference between the third embodiment and the first embodiment pertains to the positions of the first sector zones 130 and the second sector zones 140. In this embodiment, boundaries B, each between adjacent sides of one of the first sector zones 130 and one of the two second sector zones 140 adjacent thereto is at the horizontal meridian 160 or at the vertical meridian 170. The first sector zones 130 are disposed between about 0 degrees and about 90 degrees and between about 180 degrees and about 270 degrees from the horizontal meridian 160, and the second sector zones 140 are disposed between about 90 degrees and about 180 degrees and between about 270 degrees and about 0 degrees from the horizontal meridian 160. This configuration can be utilized with a patient suffering from oblique astigmatism, which involves an astigmatism axis between about 0 degrees and about 90 degrees from the horizontal meridian 160.

Figure 5:
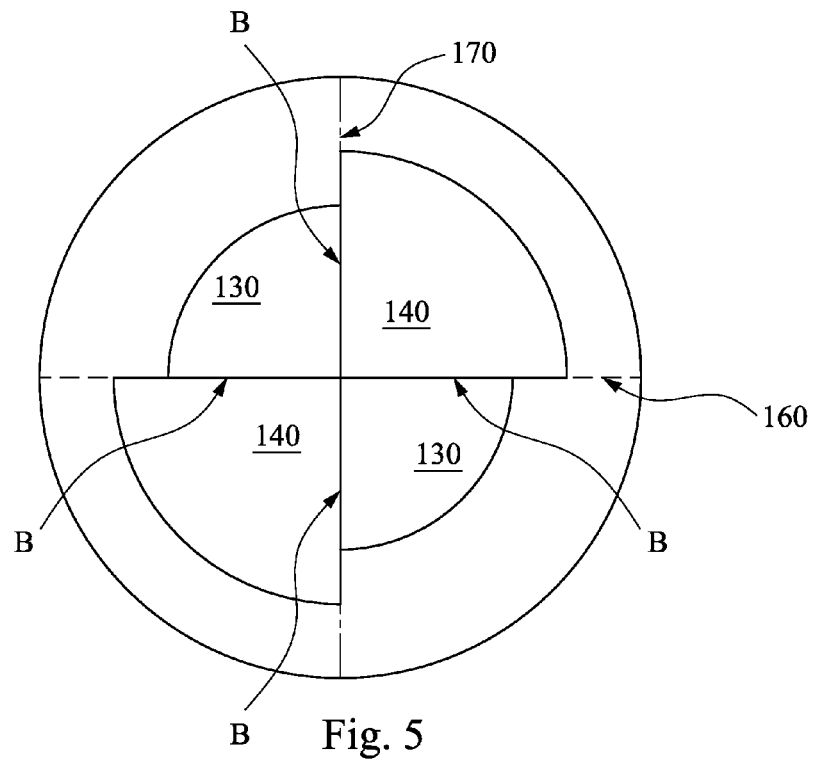
FIG. 5 is front view of a toric lens according to a fourth embodiment of the present invention.

FIG. 5 is a front view of a toric lens according to a fourth embodiment of the present invention. The difference between the fourth embodiment and the third embodiment pertains to the positions of the first sector zones 130 and the second sector zones 140. In this embodiment, the second sector zones 140 are disposed between about 0 degrees and about 90 degrees and between about 180 degrees and about 270 degrees from the horizontal meridian 160, and the first sector zones 130 are disposed between about 90 degrees and about 180 degrees and between about 270 degrees and about 0 degrees from the horizontal meridian 160. This configuration can be utilized with a patient suffering from another oblique astigmatism, which involves an astigmatism axis between about 90 degrees and about 180 degrees from the horizontal meridian 160.

Reference is made again to FIGS. 2A and 2B. In this embodiment, the toric lens can be a contact lens having a design whose optical axis covers an extended area which can ensures the cornea axial optical requirement is constantly in alignment regardless of lens movement or rotation while on the cornea. However, in other embodiments, the toric lens can be an intraocular lens, other ophthalmic lenses, or all other optical corrective designs including, but not limited to multifocal, bifocal, and myopic progression control, and the claimed scope is not limited in this respect. The first surface 110 of the toric lens can be a back surface of the contact lens and concave in shape, and the second surface 120 of the toric lens can be a front surface of the contact lens and convex in shape. It is noted that the back surface herein is a surface contacting the eye of the patient, and the front surface is a surface opposite to the back surface.

The toric lens design can be applicable to any lens fitting geometry including spherical, aspherical conical, and multi curved either spherical, aspherical, or a combination of spherical and aspherical curves.

Figure 6:
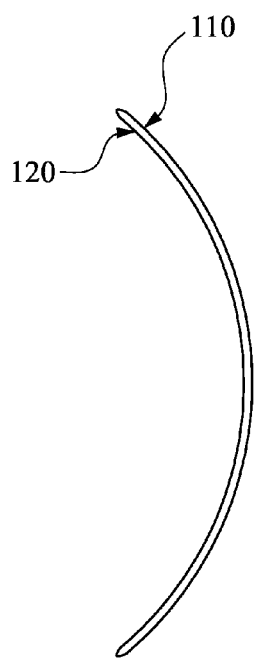
FIG. 6 is a cross-sectional view taken along the vertical meridian of FIG. 1 according to another embodiment.

FIG. 6 is a cross-sectional view taken along the vertical meridian 170 of FIG. 1 according to another embodiment. The difference between the present embodiment and the embodiment of FIG. 2A pertains to the positions of the first surface 110 and the second surface 120. In this embodiment, the first surface 110 of the toric lens can be the front surface of the contact lens and convex in shape, and the second surface 120 of the toric lens can be a back surface of the contact lens and concave in shape. Other relevant structural details of the present embodiment are all the same as the embodiment of FIG. 2A, and, therefore, a description in this regard will not be repeated hereinafter.

Figure 7:
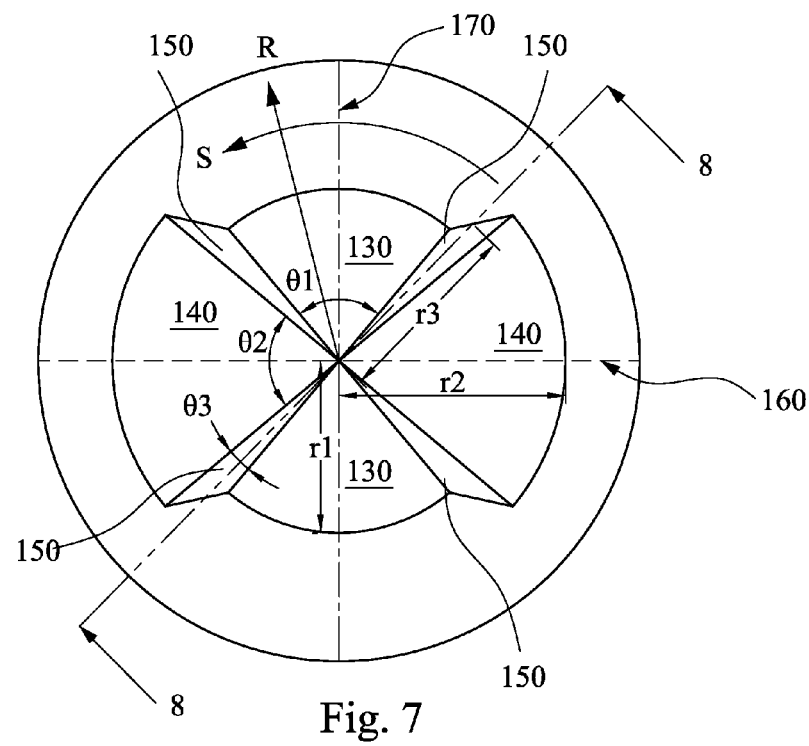
FIG. 7 is a front view of a toric lens according to a fifth embodiment of the present invention.
Figure 8:
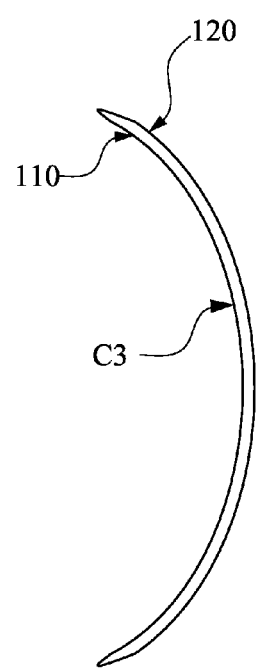
FIG. 8 is a cross-sectional view taken along line 8-8 of FIG. 7.

FIG. 7 is a front view of a toric lens according to a fifth embodiment of the present invention, and FIG. 8 is a cross-sectional view taken along line 8-8 of FIG. 7. The difference between the fifth embodiment and the first embodiment pertains to the presence of third sector zones 150 in the fifth embodiment. In this embodiment, the toric lens further includes four of the third sector zones 150 for bridging the first sector zones 130 and the second sector zones 140. Each of the third sector zones 150 can have a third curvature C3 on the first surface 110 along the radial direction R, and the third curvature is gradually decreased from the first curvature C1 (see FIG. 2B) to the second curvature C2 (see FIG. 2A) along the arc direction S. As indicated in the front view of FIG. 7, each of the third sector zones 150 has a radius r3 which is gradually increased from the radius r1 to the radius r2 along the arc direction S.

In this embodiment, a central angle $\theta 3$ of each of the third sector zones 150 is smaller than about 10 degrees. In other words, the areas of the third sector zones 150 are smaller than that of the first sector zones 130 and the second sector zones 140.

In this embodiment, the central angle $\theta 1$ of each of the first sector zones 130 and the central angle $\theta 2$ of each of the second sector zones 140 are the same. For example, when all of the central angles $\theta 3$ of the third sector zones 150 are about 10 degrees, each of the central angles $\theta 1$ and the central angles $\theta 2$ is about 80 degrees. However, the claimed scope is not limited in this respect.

In this embodiment, the horizontal meridian 160 passes through the second sector zones 140. This configuration can be utilized with a patient suffering from with-the-rule astigmatism, which involves an astigmatism axis between about 50 degrees and about 130 degrees from the horizontal meridian 160 when the central angles $\theta 3$ are about 10 degrees.

Figure 9:
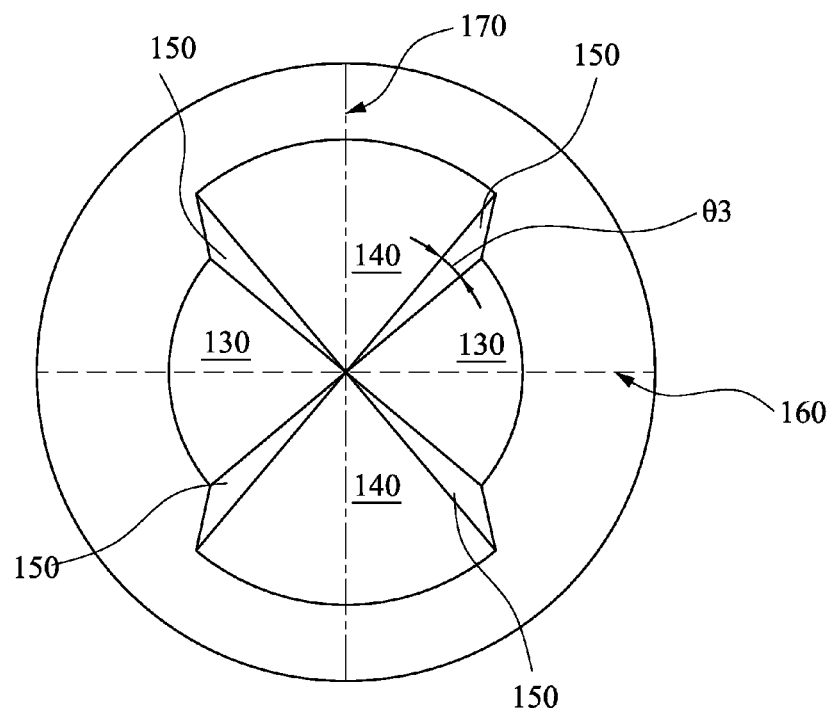
FIGS. 9, 10, and 11 are front views of toric lenses according to sixth, seventh, and eighth embodiments of the present invention, respectively.
Figure 10:
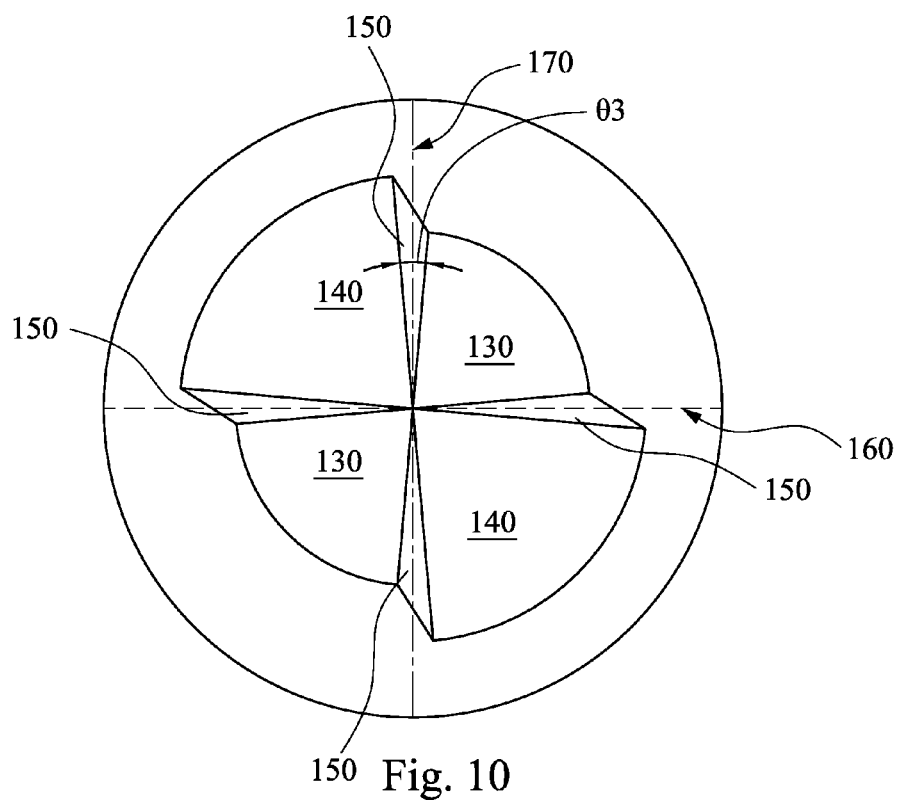
Figure 11:
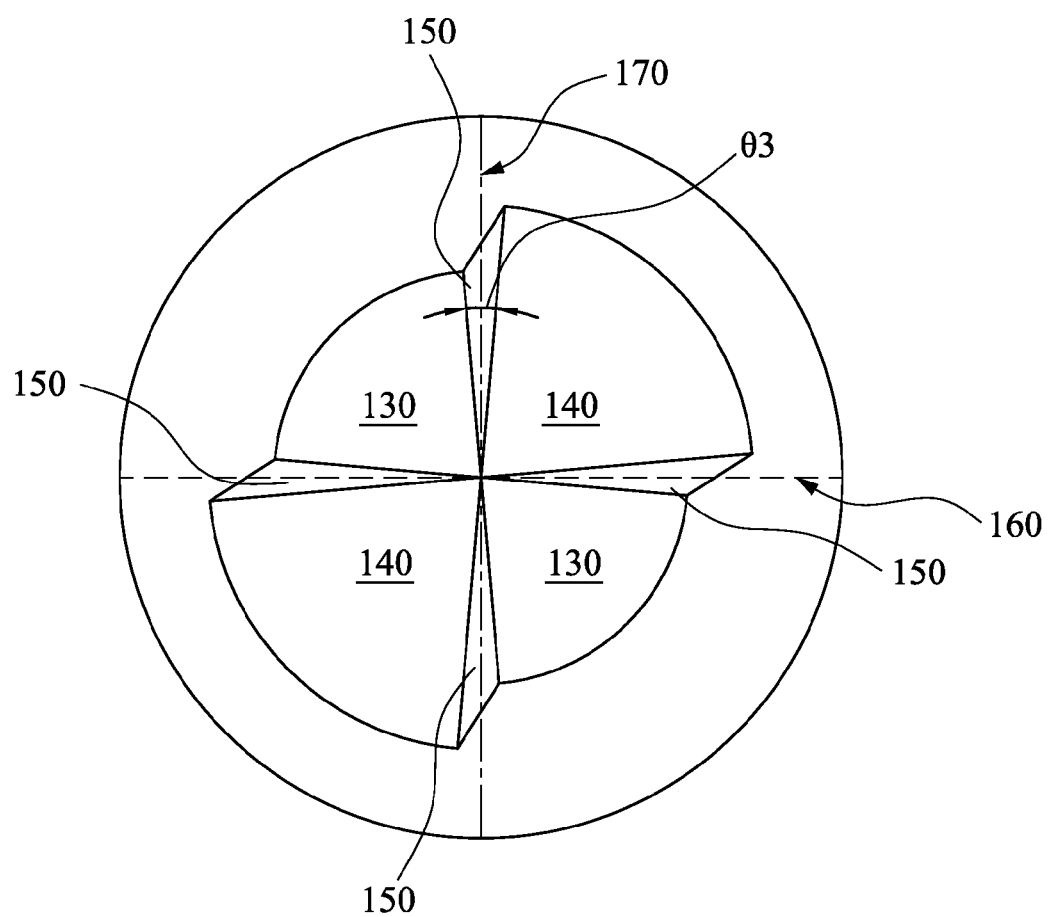

FIGS. 9, 10, and 11 are front views of toric lenses according to sixth, seventh, and eighth embodiments of the present invention, respectively. Referring first to FIG. 9, in the sixth embodiment, the horizontal meridian 160 passes through the first sector zones 130. This configuration can be utilized with a patient suffering from against-the-rule astigmatism, which involves an astigmatism axis between about 5 degrees and about 40 degrees and between about 140 degrees and about 175 degrees from the horizontal meridian 160 when the central angles $\theta 3$ are about 10 degrees. Referring to FIGS. 10 and 11, in the seventh and eighth embodiments, the horizontal meridian 160 passes through the third sector zones 150. This configuration can be utilized with a patient suffering from oblique astigmatism. The toric lens of FIG. 10 can be used with a patient having an astigmatism axis between about 5 degrees and about 85 degrees from the horizontal meridian 160 when the central angles $\theta 3$ are about 10 degrees, and the toric lens of FIG. 11 can be used with a patient having an astigmatism axis between about 95 degrees and about 175 degrees from the horizontal meridian 160 when the central angles $\theta 3$ are about 10 degrees. Other relevant structural details of the sixth to eighth embodiments are all the same as the fifth embodiment, and, therefore, a description in this regard will not be repeated hereinafter.

Hence, it is evident from the above that, in a specific diopter range, stores, clinics, etc. that sell toric lenses can have on stock only eight different types of the toric lenses described with reference to FIGS. 1 and 3-5, 7-10 and can still service all patients with astigmatism. Also with these designs, lens manufactures can simplify their whole manufacturing and warehousing process. With the design disclosed in these 8 embodiments, the stock keeping unit's (sku's) for toric lens can be reduced from over 3000 down to a few hundreds.

Compared with the conventional toric lens, the thickness and weight of the toric lens in embodiments described in this invention are both reduced, resulting in enhanced comfort for the patient. Also oxygen transmissibility of lens is increased due to thinner thickness which helps patient's eye health.

It should be mentioned here that the novel designs disclosed in this invention for visual correction works for all forms of materials irrespective of their material compositions and physical states.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A toric lens, comprising:
   a first surface and a second surface opposite to each other;
   two first sector zones, each of the first sector zones having a first curvature on the first surface along a radial direction of the toric lens, and the first curvature being constant along an arc direction of the toric lens;
   two second sector zones alternately arranged with the two first sector zones, each of the second sector zones having a second curvature on the first surface along the radial direction, and the second curvature being constant along the arc direction, wherein the first curvature is steeper than the second curvature, and a central angle of each of the first sector zones and the second sector zones range from about 80 degrees to about 90 degrees; and
   a horizontal meridian and a vertical meridian perpendicular to each other, wherein a maximum thickness of the toric lens along the horizontal meridian is greater than a maximum thickness of the toric lens along the vertical meridian.

2. The toric lens of claim 1, wherein the central angle of each of the first sector zones and the central angle of each of the second sector zones are both about 90 degrees.

3. The tonic lens of claim 2, wherein a boundary, each between adjacent sides of one of the first sector zones and one of the two second sector zones adjacent to said one of the first sector zones, is at about 45 degrees from the horizontal meridian.

4. The toric lens of claim 3, wherein the horizontal meridian passes through the two first sector zones.

5. The toric lens of claim 3, wherein the horizontal meridian passes through the two second sector zones.

6. The tonic lens of claim 2, wherein a boundary, each between adjacent sides of one of the first sector zones and one of the two second sector zones adjacent to said one of the first sector zones, is at the horizontal meridian or at the vertical meridian.

7. The toric lens of claim 6, wherein the first sector zones are disposed between about 0 degrees to about 90 degrees from the horizontal meridian, and the second sector zones are disposed between about 90 degrees to about 180 degrees from the horizontal meridian.

8. The toric lens of claim 6, wherein the second sector zones are disposed between about 0 degrees to about 90 degrees from the horizontal meridian, and the first sector zones are disposed between about 90 degrees to about 180 degrees from the horizontal meridian.

9. The toric lens of claim 1, further comprising: four third sector zones for bridging the first sector zones and the second sector zones.

10. The tonic lens of claim 9, wherein each of the third sector zones has a third curvature on the first surface along the radial direction, and the third curvature is gradually decreased from the first curvature to the second curvature along the arc direction.

11. The toric lens of claim 9, wherein a central angle of each of the third sector zones is smaller than about 10 degrees.

12. The toric lens of claim 9, wherein the central angle of each of the first sector zones and the central angle of each of the second sector zones are the same.

13. The toric lens of claim 9, wherein the horizontal meridian passes through the first sector zones.

14. The toric lens of claim 9, wherein the horizontal meridian passes through the second sector zones.

15. The tonic lens of claim 9, wherein the horizontal meridian passes through the third sector zones.

16. The toric lens of claim 1, wherein the first surface is a front surface of a contact lens, and the second surface is a back surface of the contact lens.

17. The toric lens of claim 1, wherein the first surface is a back surface of a contact lens, and the second surface is a front surface of the contact lens.

18. The toric lens of claim 1, wherein the first surface is convex or concave.

19. The toric lens of claim 1, wherein the second surface is convex or concave.

\* \* \* \* \*